United States Patent
Bagaini et al.

(10) Patent No.: US 10,816,683 B2
(45) Date of Patent: Oct. 27, 2020

(54) SEISMIC DATA RECORDING UNITS

(71) Applicant: WesternGeco L.L.C., Houston, TX (US)

(72) Inventors: Claudio Bagaini, Cottenham (GB); Einar Holst, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 14/564,031

(22) Filed: Dec. 8, 2014

(65) Prior Publication Data

US 2015/0168572 A1    Jun. 18, 2015

Related U.S. Application Data

(60) Provisional application No. 61/915,303, filed on Dec. 12, 2013.

(51) Int. Cl.
   *G01V 1/24*    (2006.01)
   *G01V 1/16*    (2006.01)
   *G01V 1/22*    (2006.01)

(52) U.S. Cl.
   CPC .............. *G01V 1/24* (2013.01); *G01V 1/16* (2013.01); *G01V 1/22* (2013.01)

(58) Field of Classification Search
   CPC .................................. G01V 1/22; G01V 1/24
   USPC ......................................................... 367/178
   See application file for complete search history.

(56) References Cited

U.S. PATENT DOCUMENTS

| 2,699,611 | A | * | 1/1955 | Norden | E21B 47/02232 |
| | | | | | 33/313 |
| 3,391,335 | A | * | 7/1968 | Patton | G01V 3/26 |
| | | | | | 324/346 |
| 3,803,540 | A | * | 4/1974 | Mar | B63B 7/00 |
| | | | | | 367/4 |
| 4,493,063 | A | * | 1/1985 | Tims | G01V 1/223 |
| | | | | | 367/77 |
| 5,372,038 | A | * | 12/1994 | Nicoletis | E21B 23/14 |
| | | | | | 166/254.2 |
| 5,531,112 | A | | 7/1996 | Young et al. | |
| 6,484,818 | B2 | * | 11/2002 | Alft | E21B 7/046 |
| | | | | | 166/255.2 |

(Continued)

FOREIGN PATENT DOCUMENTS

| EP | 0138271 | 4/1985 |
| EP | 0317385 | 5/1989 |

(Continued)

OTHER PUBLICATIONS

International search report and written opinion for the equivalent PCT patent application No. PCT/US2014/069455 dated Mar. 10, 2015.

(Continued)

*Primary Examiner* — Hovhannes Baghdasaryan
*Assistant Examiner* — Amie M Ndure
(74) *Attorney, Agent, or Firm* — Fletcher Yoder, P.C.

(57) ABSTRACT

A seismic data recording unit. The seismic data recording unit may include a housing and retractable arms coupled to the housing. The seismic data recording unit may include a respective seismic sensor coupled proximate the end of a retractable arm. The retractable arm may move from a position on or proximate the housing to a position away from the housing.

10 Claims, 9 Drawing Sheets

(56) References Cited

U.S. PATENT DOCUMENTS

| | | | |
|---|---|---|---|
| 6,549,012 B2 * | 4/2003 | Stolarczyk | G01V 3/12 324/329 |
| 6,719,069 B2 * | 4/2004 | Alft | E21B 7/046 175/24 |
| 6,791,901 B1 | 9/2004 | Robertsson et al. | |
| 7,143,844 B2 * | 12/2006 | Alft | E21B 7/046 175/40 |
| 7,202,671 B2 * | 4/2007 | Strack | G01V 3/24 324/355 |
| 7,474,591 B2 | 1/2009 | Menard et al. | |
| 8,278,929 B2 * | 10/2012 | Summerfield | G01V 3/12 324/334 |
| 2004/0000912 A1 * | 1/2004 | Conti | G01V 3/15 324/350 |
| 2008/0080318 A1 * | 4/2008 | Maxwell | G01V 1/16 367/131 |
| 2011/0132082 A1 * | 6/2011 | Pico | G01V 11/005 73/152.14 |
| 2011/0141846 A1 * | 6/2011 | Uhl | G01V 1/008 367/35 |
| 2012/0026834 A1 * | 2/2012 | Muyzert | G01V 1/20 367/58 |
| 2012/0069706 A1 * | 3/2012 | Goujon | G01V 1/201 367/37 |
| 2013/0211726 A1 | 8/2013 | Mestayer et al. | |
| 2014/0219053 A1 | 8/2014 | Goujon et al. | |
| 2014/0219055 A1 | 8/2014 | Goujon et al. | |

FOREIGN PATENT DOCUMENTS

| | | | | |
|---|---|---|---|---|
| GB | 1533111 A | * | 11/1978 | A01K 75/04 |
| WO | 2013/090544 | | 6/2013 | |

OTHER PUBLICATIONS

International Preliminary Report on Patentability issued in the realted PCT application PCT/US2014/069455, dated Jun. 14, 2016 (11 pages).

* cited by examiner

SEISMIC DATA RECORDING UNITS

CROSS-REFERENCE TO RELATED APPLICATIONS

This application claims benefit of U.S. provisional patent application Ser. No. 61/915,303, entitled DEVICE AND METHOD FOR THE LOCAL MEASUREMENT OF THE GRADIENT OF THE SEISMIC WAVEFIELD filed Dec. 12, 2013, which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth along curved paths and refract and partially reflect off subsurface seismic reflectors (e.g., interfaces between subsurface layers). These propagating signals are recorded by sensors (e.g., receivers or geophones located in seismic data recording units) laid out in a seismic spread covering a region of the earth's surface. The recorded signals may then be processed to yield a seismic survey.

SUMMARY

Described herein are implementations of various technologies for a seismic data recording unit, which may include a housing and retractable arms coupled to the housing. The seismic data recording unit may include a respective seismic sensor coupled proximate the end of a retractable arm. The retractable arm may move from a position on or proximate the housing to a position away from the housing.

Described herein are implementations of various technologies for a seismic data recording unit, which may include a housing. The housing may have an exterior shape that approximates a polygon. The seismic data recording unit may include seismic sensors disposed proximate the corners of the polygon.

Described herein are implementations of various technologies for a method, which may include deploying a seismic data recording unit for a region of interest. The seismic data recording unit may include a house and retractable arms coupled to the housing. The seismic data recording unit may include a respective seismic sensor coupled proximate the end of a respective retractable arm. The method may include moving one of the retractable arms from a position on or proximate the housing to a position away from the housing. The method may include shooting a seismic source. The method may include acquiring seismic data using the seismic data recording unit. The seismic data may correspond to shooting the seismic source. The method may include determining a horizontal gradient of a seismic wavefield using the acquired seismic data.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of the invention. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a", "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
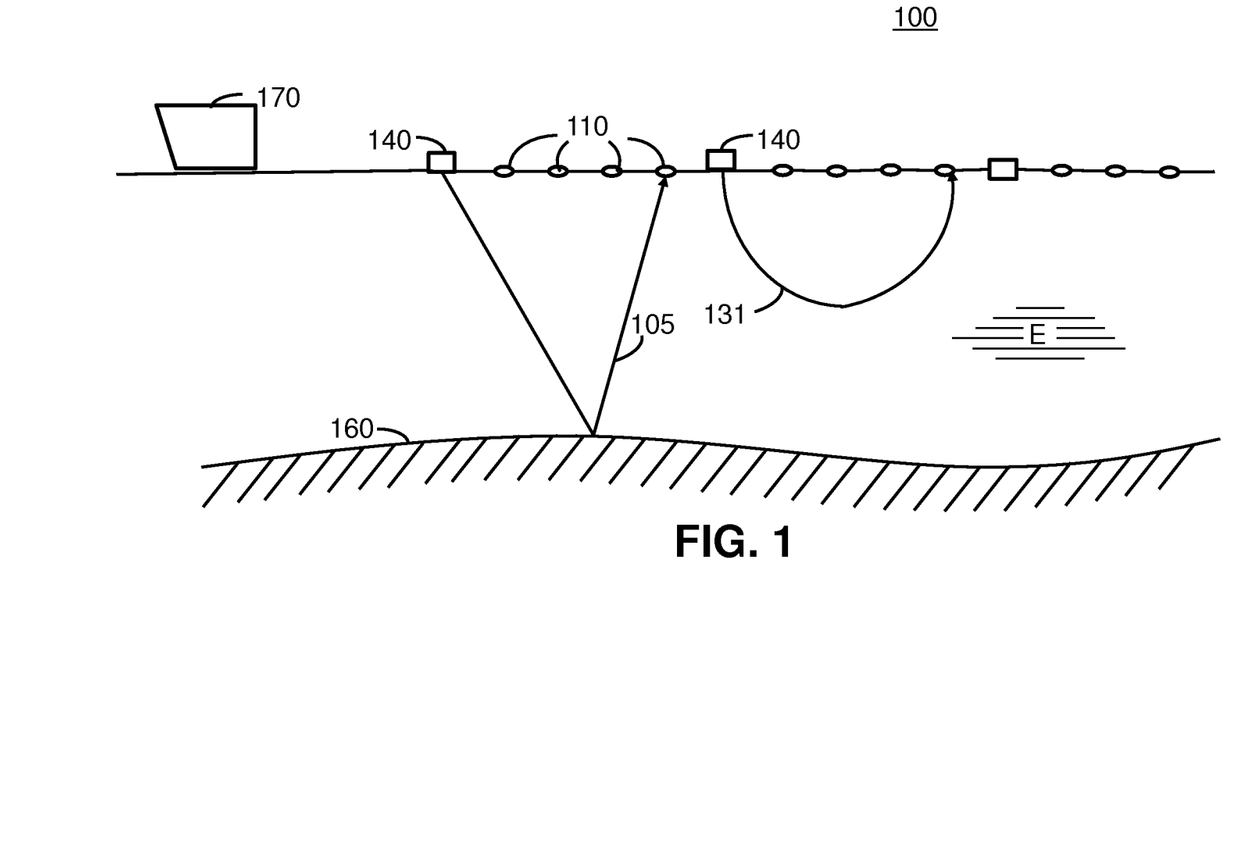
FIG. 1 illustrates a diagrammatic view of a land seismic acquisition system in accordance with various implementations described herein.

FIG. 1 illustrates a diagrammatic view of a land seismic acquisition system 100 in connection with implementations of various techniques described herein. The land seismic acquisition system 100 may include a recording station 170, and a seismic spread 105 that includes a plurality of seismic sources 140 and a plurality of seismic data recording units 110 (also called "recording units"). The seismic sources 140 may include a single type of source, or different types. The seismic sources 140 may use any type of seismic generator, such as controllable seismic sources, explosive sources such as dynamite or gas injection followed by detonation and the like. The recording units 110 may be referred to as seismic nodes, which may be blind nodes or nodes cabled or wirelessly connected to the recording station 170. Blind nodes may be passive recording devices placed over a region of interest, and may be collected after performing a seismic survey. For more information regarding seismic data recording units, see FIGS. 2A-6 below.

Keeping with FIG. 1, during acquisition, the seismic sources 140 may be deployed to encompass a region of interest. The seismic sources 140 may be periodically activated to emit seismic energy in the form of an acoustic or pressure wave through the earth E. The sources 140 may be activated individually or substantially simultaneously with other sources. The acoustic wave may result in one or more seismic wavefields that travel coherently into the earth E. As the wavefields strike interfaces 160 between earth formations, or strata, they may be reflected and/or refracted back through the earth E along paths 105 to the various recording units 110 where the wavefields (e.g., pressure waves in the case of air gun sources) may be converted to electrical signals, digitized and transmitted to the integrated computer-based source controller and recording system via the recording units 110. For instance, a refracting or diving wave path 131 is shown passing through the earth E from the sources 140 to the recording units 110. Through analysis of these detected signals, it may be possible to determine the shape, position and lithology of the sub-sea formations, including those formations that may include hydrocarbon deposits. While a land seismic survey is described in regard to FIG. 1, implementations of various techniques described herein may also be used in connection to a marine seismic survey.

After acquiring seismic data during a seismic survey, the recording units 110 may transmit the acquired seismic data to the recording station 170. The recording units 110 may transmit the acquired seismic data using wireless or wired (e.g., cables) connections. For instance, if the recording units 110 are blind nodes, the recording units 110 may be collected and brought to the recording station 170 for data offload and/or battery charging. In other implementations, the acquired seismic data may be transmitted to the recording station 170 directly from the survey locations, e.g., over cables from the recording units 110.

For placement for a seismic survey, the recording units 110 may be transported by vehicles to and from various survey locations. During transportation, the recording units 110 may be charged and data may be offloaded from the recording units 110. In another implementation, individual recording units may be stackable with other recording units. In another implementation, the seismic data recording units 110 may be configured as a drone with three or more small rotors and configured for transporting themselves to a survey location and automatically deployed at the survey location.

In analyzing the acquired seismic data, the seismic wavefield may be described as an infinitely differentiable vectorial function. As such, components of a particular seismic wavefield may be represented by a respective Taylor series that may include an infinite number of terms. Terms in the respective Taylor series may be calculated from recorded values of a particular seismic wavefield and the derivatives of those values at a single point in space. For instance, the second term of the respective Taylor series may be the horizontal gradient of the particular seismic wavefield at the surface. Boundary conditions present at the solid-air interface may link the horizontal and vertical gradients of the seismic wavefield.

Figure 2A:
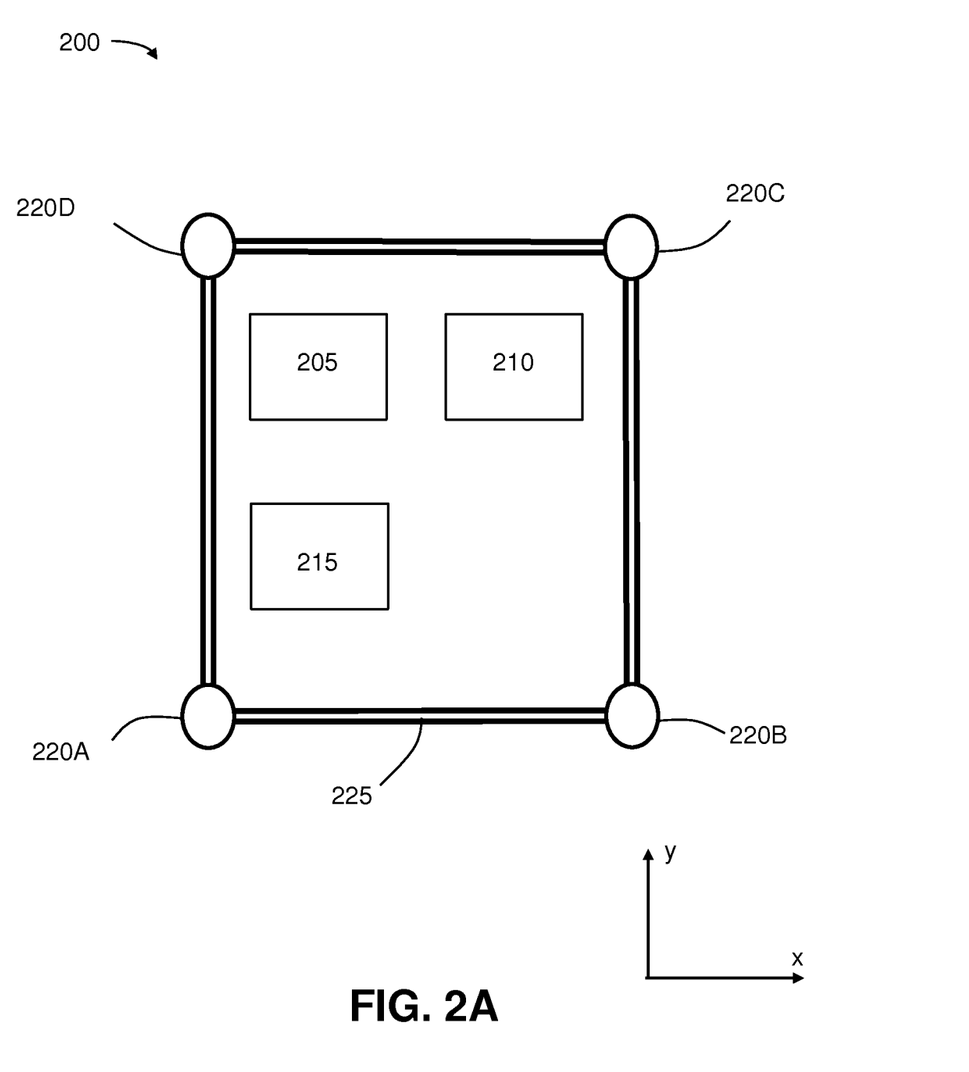
FIG. 2A illustrates a schematic of a seismic data recording unit in accordance with various implementations described herein.

FIG. 2A illustrates a schematic of a seismic data recording unit 200 in connection with implementations of various techniques described herein. The recording unit 200 may include a housing 225, a battery 205, one or more processors 210, a memory 215 and four seismic sensors 220A, 220B, 220C and 220D. In FIG. 2A, the recording unit 200 is shown from an overhead view where the housing 225 has an exterior shape that approximates a square. As such, the seismic sensors 220A-220D may be disposed approximately at the four corners of the square.

In other implementations, the exterior shape of the housing 225 may include other polygonal or polyhedral shapes, such as triangles (e.g., see FIG. 4), other rectangles, pentagons, hexagons, or other multi-sided shapes. For instance, where the exterior shape of the housing 225 has a pentagonal shape, seismic sensors may be disposed approximately at the five corners of the pentagon. In some implementations, each side of the housing may be 40 cm or less. In another implementation, the recording unit 200 may have a hollow configuration, where various components, such as the battery 205 or the one or more processors 210 may be disposed in the housing 225.

For acquiring seismic data, the seismic sensors 220A-220D may include pressure sensors and/or particle motion sensors, such as geophones, hydrophones or combination thereof, including a microelectromechanical systems (MEMS) geophone. In one implementation, at least one of the seismic sensors 220A-220D may include a multi-component sensor that records seismic data for one, two or three spatial axes. As such, the axes may be orthogonal to one another.

Using particle motion data acquired by the recording unit 200, the pressure gradient of a seismic wavefield may be determined in the horizontal direction (i.e., the x-y plane) or the vertical direction (i.e., the z plane). During a seismic survey, the size of the wavelengths of a particular seismic wavefield may be large for many frequencies within the seismic bandwidth. As such, the seismic sensors 220A-220D may be separated from each other by a predetermined distance configured to span various desired wavelengths in the seismic bandwidth.

In acquiring measurements for determining a pressure gradient, measurements recorded by individual seismic sensors may be affected by various factors, such as different sensor calibrations, mechanical perturbations, electronic noise and different coupling conditions between sensors and their corresponding recording units. The effect of these interactions and vibrations may not be negligible, for instance, where the difference of the recorded signals at the seismic sensors 220A-220D is small with respect to the amplitudes of the seismic wavefields. Likewise, recorded seismic data at the seismic sensors 220A-220D may be affected by environmental noise, such as wind or rain. In one implementation, this environmental noise may be removed or reduced through a polyhedral cover around the recording unit 200. As such, the seismic sensors 220A-220D may be coupled to the same recording unit 200 to reduce or remove these various factors that may affect the recorded seismic data regarding different seismic signals.

Further, the seismic sensors 220A-220D may be mechanically isolated from noise and other mechanical perturbations in the recording unit 200, while being electrically connected to the one or more processors 210, the memory 215 and other recording unit 200 components. For instance, the seismic sensors 220A-220D may have an electrical connection to the recording unit 200 for transmitting electrical signals and receiving power, while being physically insulated at least partially from mechanical operations occurring in the rest of the recording unit 200. In some implementations, the seismic sensors 220A-220D may be mechanically isolated using noise-preventive lateral walls (e.g., fluffy walls) that are physically separated from the seismic sensors 220A-220D. In some implementations, the seismic sensors 220A-220D may be mechanically decoupled from each other. As such, an individual seismic sensor may measure the seismic wavefield at the corresponding location of that individual sensor without measuring the seismic wavefield measured by another seismic sensor.

When deployed for a seismic survey, the recording unit 200 may be positioned inside the earth or placed on the earth's surface, for example, with hard terrains. In one implementation, a respective spike may be placed under each seismic sensor 220A-220D. The respective spikes may be pushed into the ground, while leaving at least a portion of the housing 225 on top of the earth's surface. In other implementations, the housing 225 may also have a flat bottom for placement directly on the ground.

Figure 2B:
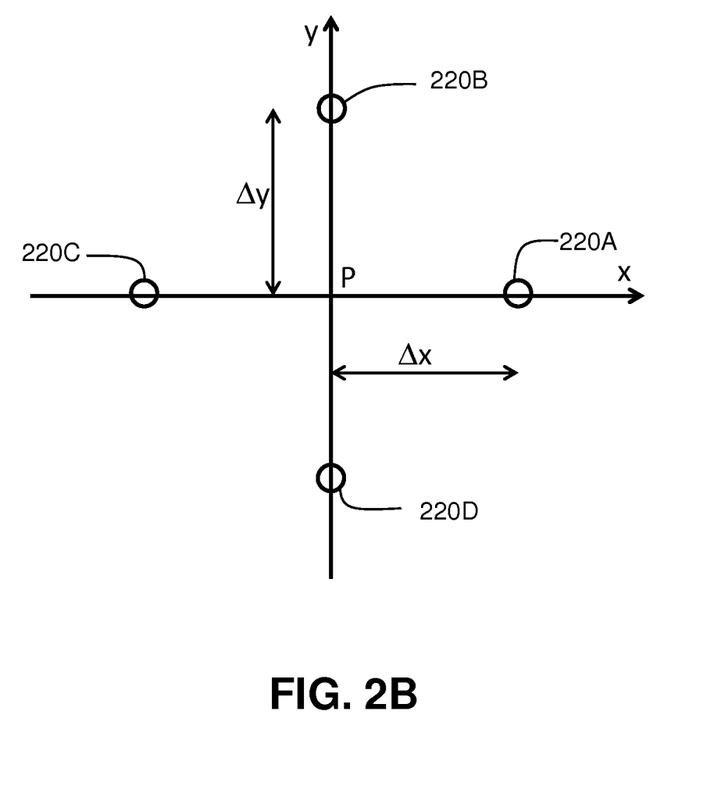
FIG. 2B illustrates a diagram of the relative distances of seismic sensors in accordance with various implementations described herein.

FIG. 2B illustrates the relative distances of the seismic sensors 220A-220D in connection with implementations of various techniques described herein. As such, the relative distances may describe the physical displacement between the seismic sensors 220A-220D outside the housing 225. From the perspective of the x-y plane, $\Delta X$ shows the relative distance in the x-axis between seismic sensors 220A and 220D. $\Delta Y$ shows the relative distance in the y-axis between seismic sensors 220C and 220B. By having the seismic sensors 220A-220D included in a single fixed device, as shown in FIG. 2A, the relative positions of the seismic sensors 220A-220D may be fixed and/or known. As such, the relative positions of corresponding seismic sensors and their corresponding relative distances may be identifiable for calculating pressure gradients using seismic data from the recording unit 200.

Figure 3:
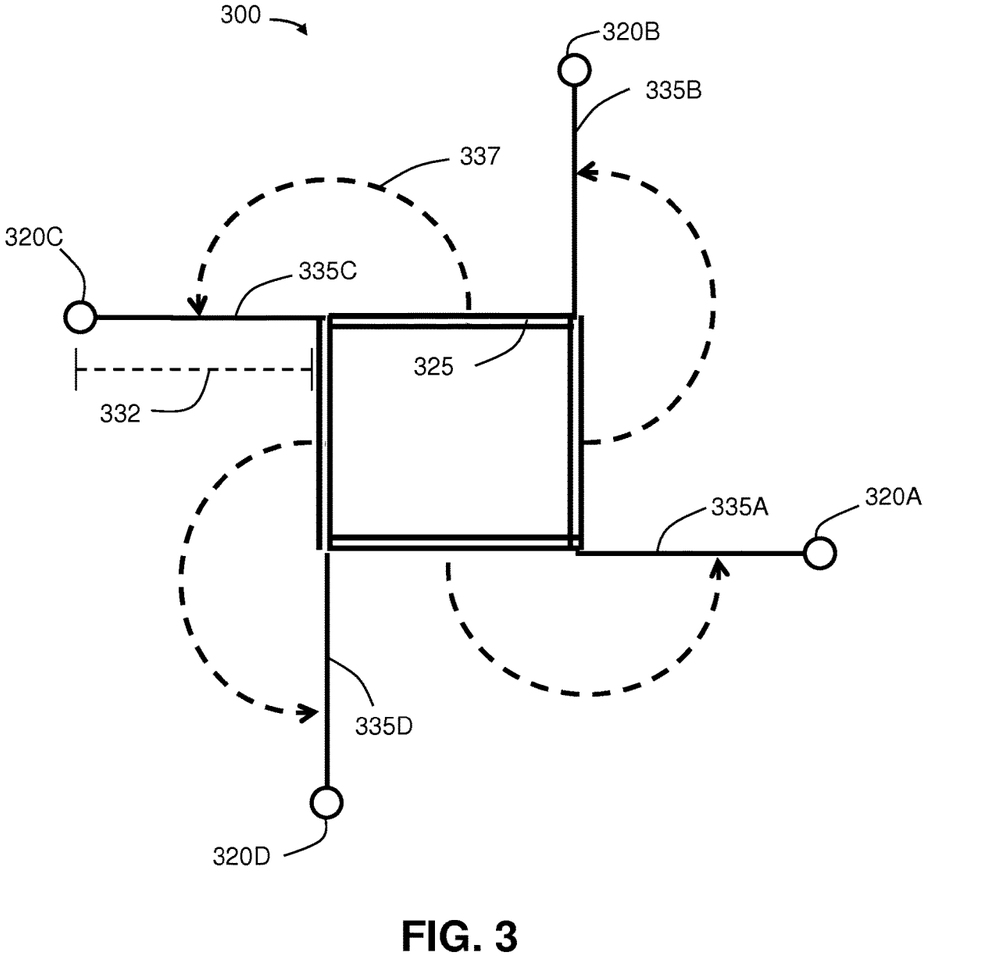
FIG. 3 illustrates a schematic of a seismic data recording unit in accordance with various implementations described herein.

FIG. 3 illustrates a schematic of the seismic data recording unit 300 in connection with implementations of various techniques described herein. The recording unit 300 may include a housing 325, one or more processors (not shown), a memory (not shown), respective seismic sensors 320A-320D and retractable arms 335A-335D. The respective seismic sensors 320A-320D may be coupled respectively to the retractable arms 335A-335D. For instance, the respective seismic sensor 320A may be coupled proximate the end of the retractable arm 335A, while the respective seismic sensor 320B may be coupled proximate the end of the retractable arm 335B. In other implementations, the respective seismic sensors 320A-320D may be positioned at any point along the respective retractable arm for that respective seismic sensor. The seismic sensors 320A-320D may be similar to the seismic sensors 220A-220D described in FIG. 2A.

Keeping with FIG. 3, the retractable arms 335A-335D may be extended outward from the housing 325 (also called a Catherine wheel configuration) for recording seismic data. For instance, the retractable arm 335C may fold out away from the housing 325 and adjust over the span of the arm range 337. For transportation, the recording unit 300 may be configured for a closed position proximate the housing 325 that may appear similar to FIG. 2A. As such, the retractable arms 335A-335D may be positioned near or inside the housing 325 for travel. When the retractable arm 335C is unfolded, the respective seismic sensor 320C may be positioned at a predetermined position away from the housing 325. In one instance, the predetermined position may place the respective seismic sensor 320C at a distance 332 from the housing 325 that is the approximate length of the retractable arm 335C as shown in FIG. 3. As such, having the seismic sensors 320A-320D coupled to the retractable arms 335A-335D may provide the relative distances of the seismic sensors 320A-320D to one another in a manner similar to FIG. 2B. The relative positions of the retractable arms 335A-335D or the seismic sensors 320A-320D may then be used to calculate a horizontal gradient of a pressure wavefield.

In another implementation, one or more of the retractable arms 335A-335D may be inserted at least partially into the housing 325. As such, the one or more of the retractable arms 335A-335D may be pulled out to a predetermined position with respect to the housing 325.

In another implementation, one or more of the retractable arms 335A-335D may include one or more antennae. For instance, where the retractable arms 335A-335D are configured to be perpendicular to the housing 330, multiple-input and multiple-output (MIMO) technology may be utilized for wireless communication and MIMO polarization diversity. The one or more antenna may be used to communicate with the recording station 170, e.g., transmitting seismic data to the recording station 170 or receive commands from the recording station 170. In another implementation, one or more of the retractable arms 335A-335D may include other components, such as a battery, a global position system (GPS) device, or a compass. For instance, the compass may be used to determine the orientation of the respective seismic sensor in the corresponding retractable arm. In one implementation, the compass may be coupled to a battery in the corresponding retractable arm. In another implementation, the battery and the electronics may be disposed at a predetermined distance from the compass inside the corresponding retractable arm. The predetermined distance may be configured to reduce or eliminate magnetic disturbance on the compass from the battery and other electronics in the recording unit 300.

Figure 4:
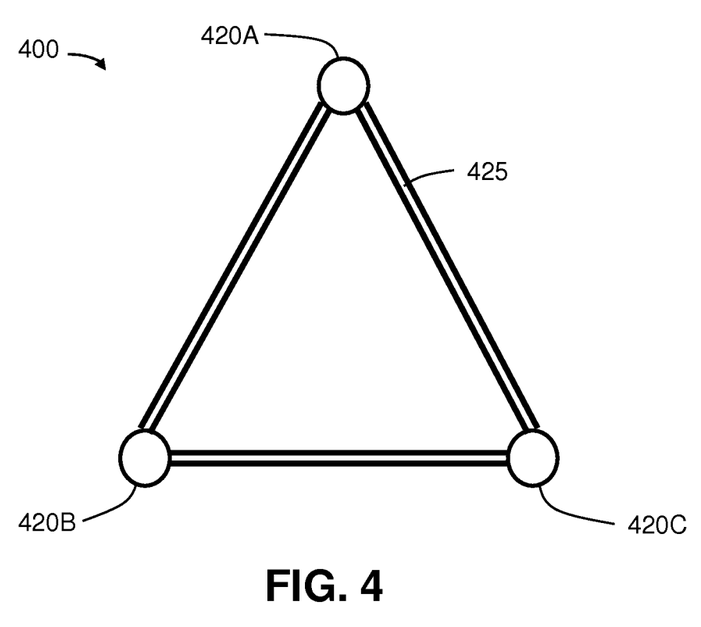
FIG. 4 illustrates a schematic of a seismic data recording unit in accordance with various implementations described herein.

FIG. 4 illustrates a schematic of a seismic data recording unit 400 in connection with implementations of various techniques described herein. The recording unit 400 may be similar to recording unit 200. The recording unit 400 may include a housing 425 and seismic sensors 420A-420C that may include particle motion sensors. As shown, the exterior shape of the housing 425 may approximate a triangle with the seismic sensors 420A-420C disposed at the corners of the triangle. The seismic sensors 420A-420C may be similar to the seismic sensors 220A-220D described in FIG. 2A.

Figure 5:
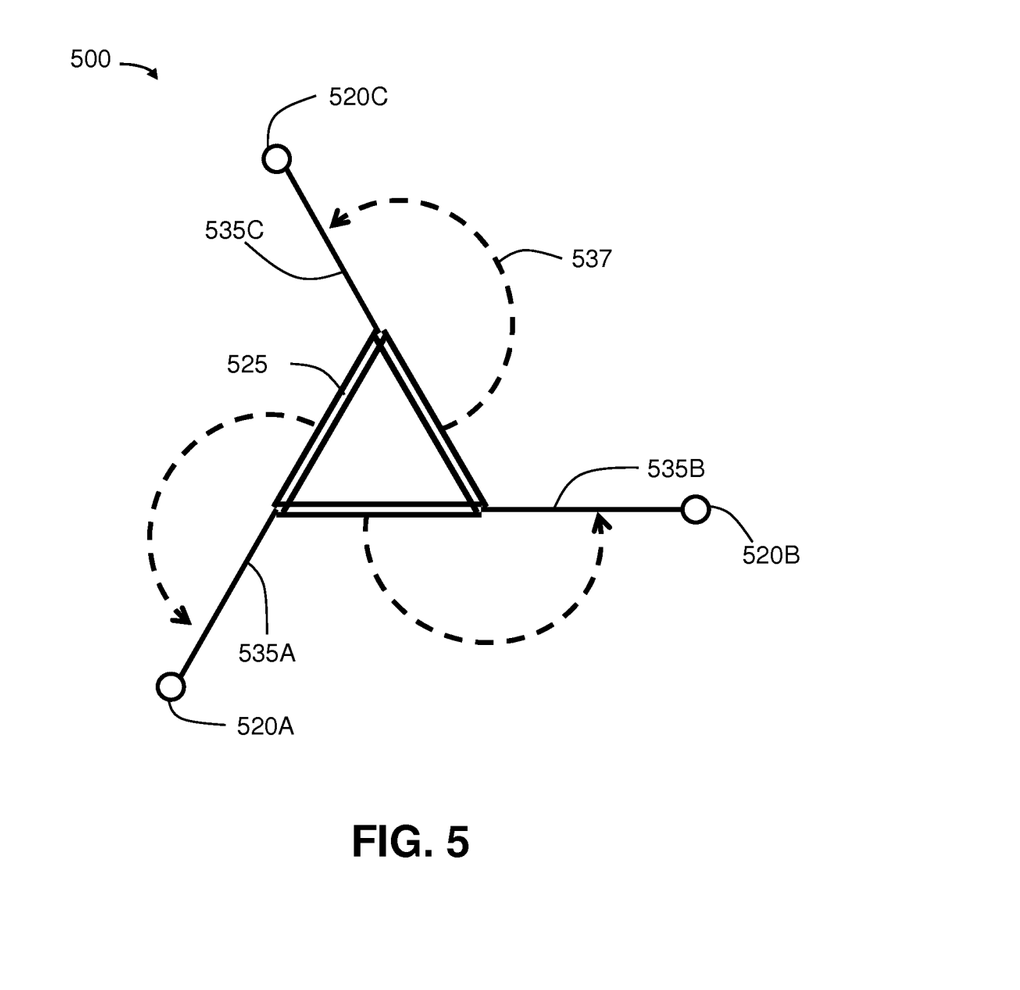
FIG. 5 illustrates a schematic of a seismic data recording unit in accordance with various implementations described herein.

FIG. 5 illustrates a schematic of a seismic data recording unit 500 in connection with implementations of various techniques described herein. The recording unit 500 may be similar to recording unit 300. The recording unit 500 may include a housing 525, respective seismic sensors 520A-520C, and retractable arms 535A-535C. As shown, the exterior shape of the housing 525 may approximate a triangle. Similar to FIG. 3, the respective seismic sensors 520A-520D may be coupled respectively to the retractable arms 535A-535D. The respective seismic sensors 520A-520D may be similar to the seismic sensors 220A-220D described in FIG. 2A.

Figure 6:
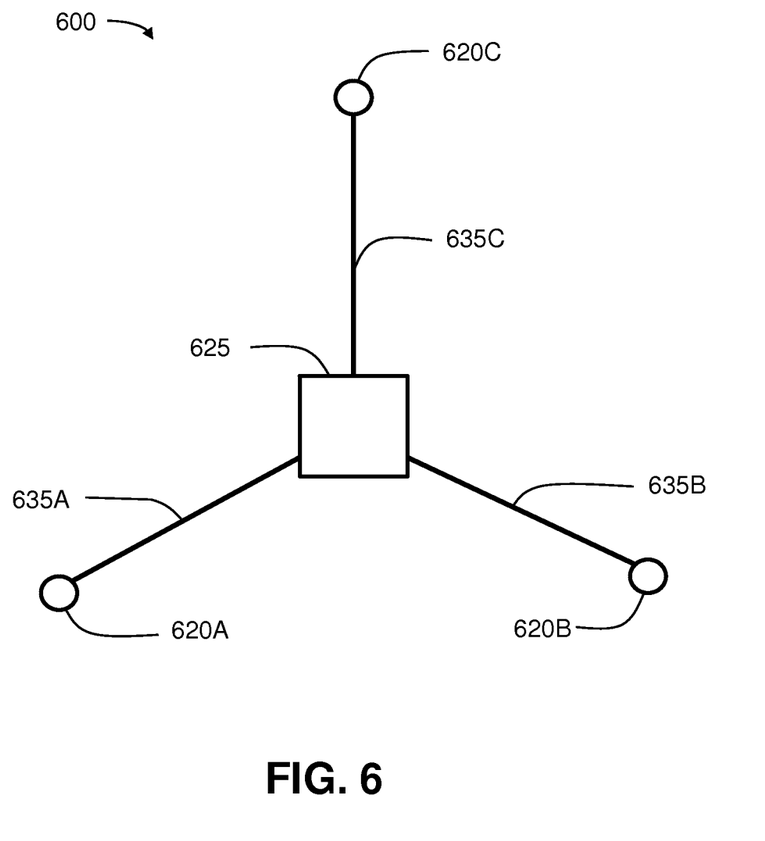
FIG. 6 illustrates a schematic of a seismic data recording unit in accordance with various implementations described herein.

FIG. 6 illustrates a schematic of a seismic data recording unit 600 in connection with implementations of various techniques described herein. The recording unit 600 may include retractable arms 635A-635C and respective seismic sensors 620A-620C. The retractable arms 635A-635C may be configured for insertion and withdrawal at least partially from predetermined locations in a housing 625. In some implementation, the retractable arms 635A-635C may be folded along the vertical axis to a predetermined position proximate the housing 625. As shown, the exterior shape of the housing 525 may approximate a square, but other shapes are contemplated as well. The respective seismic sensors may be similar to the seismic sensors 320A-320D described in FIG. 3.

Figure 7:
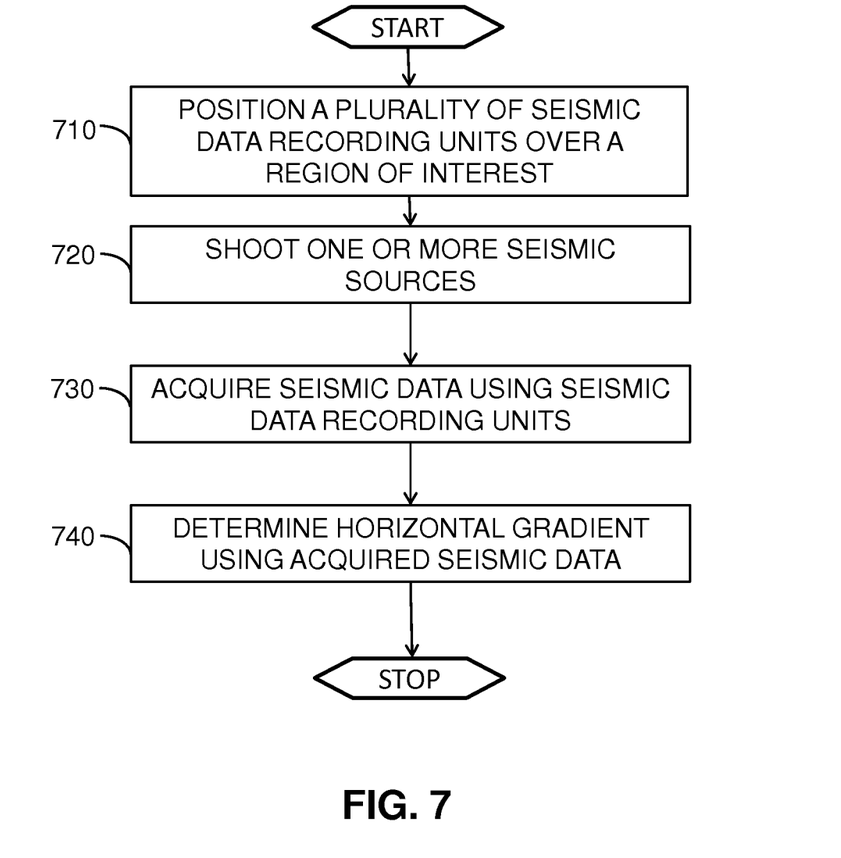
FIG. 7 illustrates a flow diagram of a method for processing seismic data from seismic data recording units in accordance with various implementations described herein.

FIG. 7 illustrates a flow diagram of a method acquiring and processing data from seismic data recording units in accordance with various implementations described herein. It should be understood that while the operational flow diagram indicates a particular order of execution of the operations, in other implementations, the operations might be executed in a different order. Further, in some implementations, additional operations or blocks may be added to the method. Likewise, some operations or blocks may be omitted.

At block 710, a plurality of seismic data recording units 110 may be positioned over a region of interest for a seismic survey. For more information regarding the recording units 110, see FIGS. 2A-2B, 3-6 above. For more information regarding performing a seismic survey, see FIG. 1 above.

At block 720, one or more seismic sources may be shot during the seismic survey.

At block 730, seismic data may be acquired using the recording units 110. The acquired seismic data may correspond to the one or more seismic sources shot at block 720.

At block 740, a horizontal gradient regarding one or more seismic wavefields may be determined using the acquired seismic data from block 730. For more information regarding calculating the horizontal and/or vertical gradients of seismic wavefields, see commonly assigned U.S. patent application Ser. No. 14/158,115 entitled COMPUTING ROTATION DATA USING A GRADIENT OF TRANSLATIONAL DATA filed Jan. 17, 2014, now published as U.S. Patent Application Publication No. 2014/0219055 A1, which is herein incorporated by reference.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. The distributed computing environments may span multiple continents and multiple vessels, ships or boats. In a distributed computing environment, program modules may be located in both local and remote computer storage media including memory storage devices.

Figure 8:
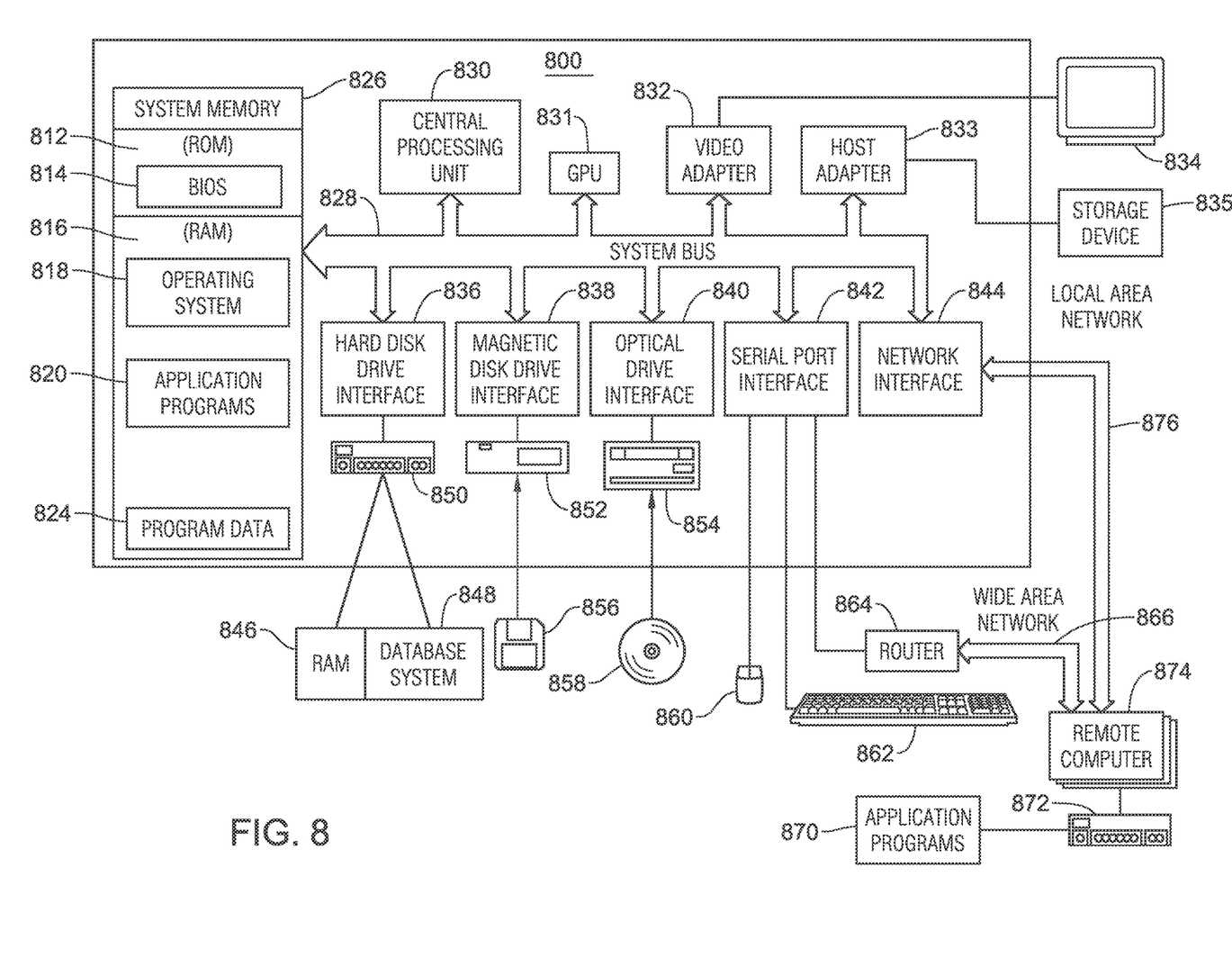
FIG. 8 illustrates a computing system in which the various technologies and techniques described herein may be incorporated and practiced.

FIG. 8 illustrates a schematic diagram of a computing system 800 in which the various technologies described herein may be incorporated and practiced. Although the computing system 800 may be a conventional desktop or a server computer, as described above, other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although one CPU is illustrated in FIG. 8, it should be understood that in some implementations the computing system 800 may include more than one CPU. The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and the processing units may include one or more cores. The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read-only memory (ROM) 812 and a random access memory (RAM) 816. A basic input/output system (BIOS) 814, containing the basic routines that help transfer information between elements within the computing system 800, such as during start-up, may be stored in the ROM 812.

The computing system 800 may further include a hard disk drive 850 for reading from and writing to a hard disk, a magnetic disk drive 852 for reading from and writing to a removable magnetic disk 856, and an optical disk drive 854 for reading from and writing to a removable optical disk 858, such as a CD ROM or other optical media. The hard disk drive 850, the magnetic disk drive 852, and the optical disk drive 854 may be connected to the system bus 828 by a hard disk drive interface 836, a magnetic disk drive interface 838, and an optical drive interface 840, respectively. The drives and their associated computer-readable media may provide nonvolatile storage of computer-readable instructions, data structures, program modules and other data for the computing system 800.

Although the computing system 800 is described herein as having a hard disk, a removable magnetic disk 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 850, magnetic disk 856, optical disk 858, ROM 812 or RAM 816, including an operating system 818, one or more application programs 820, program data 824, and a database system 848. The application programs 820 may include various mobile applications ("apps") and other applications configured to perform various methods and techniques described herein. The operating system 818 may be any suitable operating system that may control the operation of a networked personal or server computer, such as Windows® XP, Mac OS® X, Unix-variants (e.g., Linux® and BSD®), and the like.

A user may enter commands and information into the computing system 800 through input devices such as a keyboard 862 and pointing device 860. Other input devices may include a microphone, joystick, game pad, satellite dish, scanner, or the like. These and other input devices may be connected to the CPU 830 through a serial port interface 842 coupled to system bus 828, but may be connected by other interfaces, such as a parallel port, game port or a universal serial bus (USB). A monitor 838 or other type of display device may also be connected to system bus 828 via an interface, such as a video adapter 832. In addition to the monitor 838, the computing system 800 may further include other peripheral output devices such as speakers and printers.

Further, the computing system 800 may operate in a networked environment using logical connections to one or more remote computers 878. The logical connections may be any connection that is commonplace in offices, enterprise-wide computer networks, intranets, and the Internet, such as local area network (LAN) 876 and a wide area network (WAN) 866. The remote computers 874 may be another a computer, a server computer, a router, a network PC, a peer device or other common network node, and may include many of the elements describes above relative to the computing system 800. The remote computers 874 may also each include application programs 870 similar to that of the computer action function.

When using a LAN networking environment, the computing system 800 may be connected to the local network 876 through a network interface or adapter 844. When used in a WAN networking environment, the computing system 800 may include a router 864, wireless router or other means for establishing communication over a wide area network 866, such as the Internet. The router 864, which may be internal or external, may be connected to the system bus 828 via the serial port interface 842. In a networked environment, program modules depicted relative to the computing system 800, or portions thereof, may be stored in a remote memory storage device 835. It will be appreciated that the network connections shown are merely examples and other means of establishing a communications link between the computers may be used.

The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate that any of the listed architectures, features or standards discussed above with respect to the example computing system 400 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A seismic data recording unit for use in a seismic spread, comprising:
    a housing having an exterior shape that approximates a polygon, the polygon having three or more corners and including at least one of a rectangle and a triangle; and
    a plurality of seismic sensors, wherein each of the plurality of seismic sensors is affixed to the polygon at one or more retractable arms at each of the three or more corners of the polygon, wherein the plurality of seismic sensors are within the same plane, wherein each of the plurality of seismic sensors is used to determine a pressure gradient in a vertical direction, wherein each of the plurality of seismic sensors is separated from each other by a predetermined distance configured to span one or more desired wavelengths in a seismic bandwidth.

2. The seismic data recording unit of claim 1, further comprising:
    a processor; and
    a memory comprising program instructions executable by the processor to receive seismic data from the three or more seismic sensors.

3. The seismic data recording unit of claim 2, further comprising a cable coupled to the housing, the cable being configured to transmit the received seismic data to a recording station.

4. The seismic data recording unit of claim 1, wherein the seismic sensors are multi-component sensors.

5. The seismic data recording unit of claim 1, wherein the relative positions of the three or more seismic sensors are configured to be used to calculate a horizontal gradient of a seismic wavefield.

6. A method, comprising:
    deploying a seismic data recording unit for use in a seismic spread for a region of interest, wherein the seismic data recording unit comprises:
        a housing;
        three or more retractable arms coupled to the housing; and
        at least three seismic sensors, each respective seismic sensor coupled at a distal end with respect to the housing of a respective retractable arm of the three or more retractable arms so that when the unit is laid flat on the Earth's surface the respective seismic sensors are separated from one another by a horizontal distance;
    moving each of the retractable arms from a first position on or proximate the housing to a second position away from the housing;
    shooting one or more seismic sources;
    acquiring seismic data using the seismic data recording unit, wherein the seismic data corresponds to shooting the one or more seismic sources; and
    determining a horizontal gradient of a seismic wavefield and a vertical gradient of a seismic wavefield using the acquired seismic data.

7. The method of claim 6, wherein the second position is at a distance that is substantially the length of the respective retractable arm.

8. The method of claim 6, wherein the horizontal gradient is determined using the relative distances between the respective seismic sensors.

9. The method of claim 6, further comprising transmitting, over a wireless connection, the seismic data from the seismic data recording unit to a recording station.

10. A seismic data recording unit for use in a seismic spread, comprising:
    a housing;
    three or more retractable arms coupled to the housing; and
    at least three seismic sensors, each respective seismic sensor coupled at a distal end with respect to the housing of a respective retractable arm of the three or more retractable arms so that when the unit is laid flat on the Earth's surface the respective seismic sensors are separated from one another by a horizontal distance, wherein each of the retractable arms is configured to move from a first position on or proximate the housing to a second position away from the housing, wherein each of the at least three seismic sensors is used to determine a pressure gradient in a vertical direction.

* * * * *